United States Patent [19]

Petersen

[11] 3,994,540
[45] Nov. 30, 1976

[54] PRESSURE BALANCED BEARING WITH EXTERNAL HEIGHT CONTROL VALVE

[75] Inventor: Niel R. Petersen, Hopkins, Minn.

[73] Assignee: MTS Systems Corporation, Minneapolis, Minn.

[22] Filed: Dec. 4, 1975

[21] Appl. No.: 637,823

[52] U.S. Cl. .................................. 308/3 R; 108/143
[51] Int. Cl.² .......................................... F16C 29/02
[58] Field of Search ............... 308/3 R, 3 A, 9, 36.3, 308/DIG. 1; 91/392; 108/143; 51/56, 216 R, 216 ND; 72/402

[56] References Cited
UNITED STATES PATENTS 3,921,286  11/1975  Petersen ............................ 308/3 R Primary Examiner—M. H. Wood, Jr.
Assistant Examiner—Gene A. Church
Attorney, Agent, or Firm—Dugger, Johnson & Westman

[57] ABSTRACT

A pressure balance bearing providing a hydrostatic bearing film, which is connected to maintain a load or device in a constant position in relation to a reference or support surface. Several support bearings are plumbed together so that there may be cross flow between the bearings. An external control valve is mounted on the member and senses the relative position of the object. The valve in turn adjusts the flow of oil into the bearings as a function of changes of relative position of the object and reference or support surface. As shown, a large mass is supported on the pressure balance bearings and is capable of bilateral movement. The mass is supported on a plurality of bearings using three control valves arranged in a tripod configuration.

14 Claims, 3 Drawing Figures

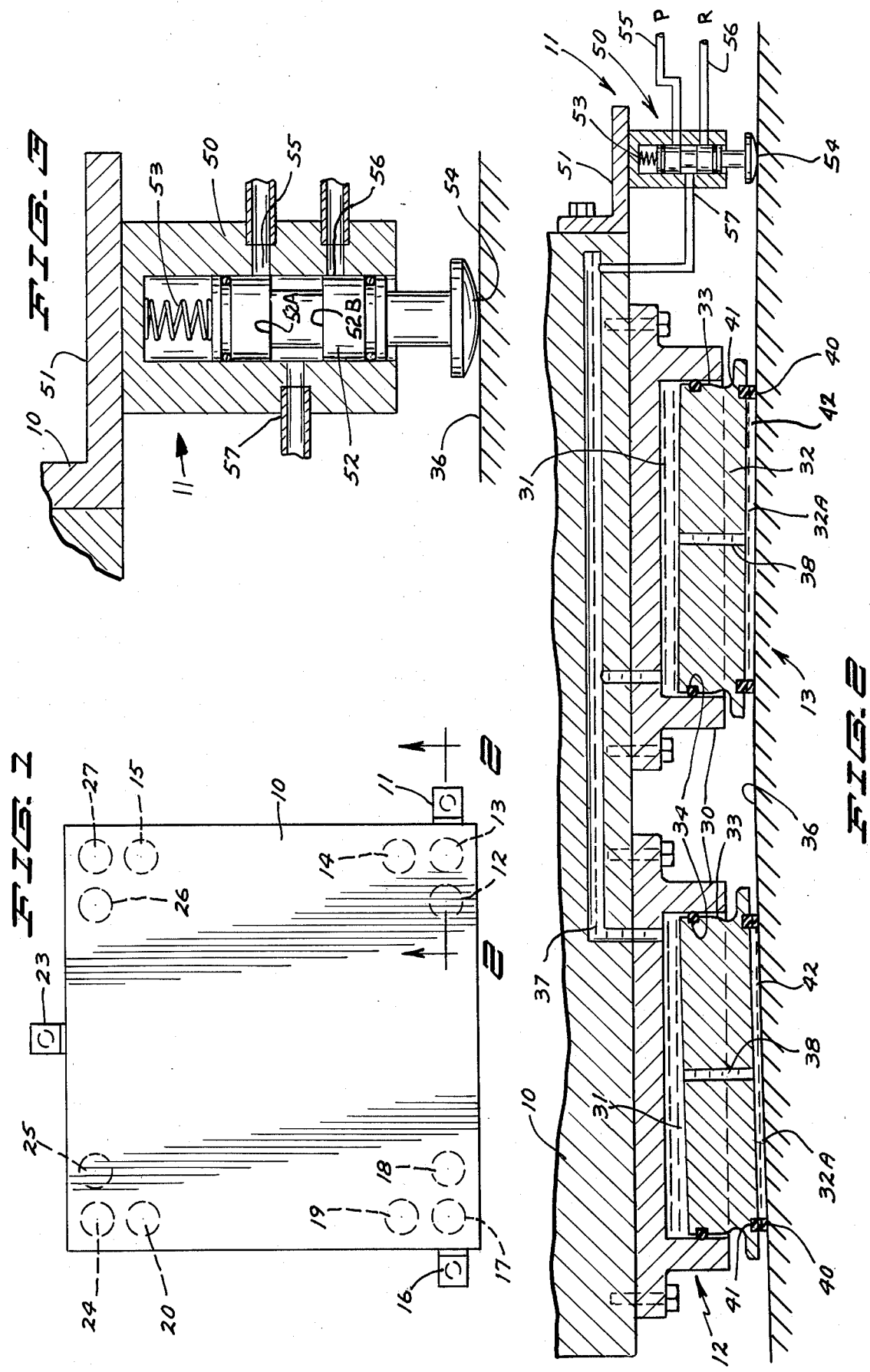

PRESSURE BALANCED BEARING WITH EXTERNAL HEIGHT CONTROL VALVE

BACKGROUND OF THE INVENTION

1. Field of the Invention

The present invention relates to systems for support of objects on pressure balanced bearings.

2. Prior Art

A system for hydrostatic bearings using a pressure balance configuration in its broad sense is shown in my copendng patent application Serial No. 470,631, filed May 16, 1974, now Pat. No. 3,921,286. The present device is one which specifically uses a valve that has external sensing of height for an object being supported.

SUMMARY OF THE INVENTION

The present invention relates to a pressure balanced hydrostatic bearing providing support for an object through use of a plurality of adjustable piston and cylinder combinations at spaced locations on the object. The piston and cylinder combinations are controlled by external height control valves that sense deviations of the supported object relative to the supporting surface to provide adjustments in flow supplied to the bearings for height control.

In the form shown, a large mass is shown supported in relation to a surface using multiple pressure balanced bearings that are connected together in selected sets with a single external control valve for each of the sets to give the automatic height control. The use of a common conduit connection between the individual bearings in a set allows cross flow so that all of the bearings in a set equally share the load despite distortions of the bearing surfaces. The external height control valve in turn regulates the volume of oil supplied to the bearings in its set and is responsive to changes in height of the object being supported.

In the form shown, the mass block being supported is controlled through the use of three external control valves mounted in a tripod arrangement on the block to maintain the block at a desired height and in position for biaxial motion. The external height control valve can either be a three way valve used with a fixed pressure source, or a two way valve if operated from a fixed flow source.

BRIEF DESCRIPTION OF THE DRAWINGS

FIG. 1 is a top plan view of a typical mass block support on the hydrostatic bearing controlled in accordance with the present invention;

FIG. 2 is a fragmentary part schematic view taken as on line 2—2 in FIG. 1; and

FIG. 3 is a sectional view of a typical control valve utilized for external height control sensing in accordance with the present invention.

DESCRIPTION OF THE PREFERRED EMBODIMENT

Referring to FIG. 1, a block 10 is shown. The block 10 is a mass block that must be capable of bilateral motion for example in a horizontal plane under external forces. The mass block must be supported so that it moves relative to the support floor with little restriction. In other words, no significant forces acting on the support surface should be transmitted to the mass, or vice versa.

In a typical system, the mass block may be on the order of 30 feet by 30 feet square, and weight in the range of several hundred tons. Thus, the physical size and dimensions may be great.

In the form shown, on the underside of the mass block 10 there are a plurality of pressure balanced bearings each of which may be identically constructed physically. The pressure balanced bearings are hydraulic cylinaer-piston assemblies which will support the mass block on a pressurized perimeter scaled area on the floor surface, while permitting biaxial motion of the mass block.

In the form shown, there are three of these pressure balanced bearing assemblies at each of the corners of the rectilinear block, and these bearing assemblies are arranged in bearing sets. Each of the bearing sets is controlled by a separate coaxial control valve that in turn is used for sensing the height of the mass block above the supporting surface and will control flow to the bearings in the associated set.

The bearings in each set are coupled for cross flow, as will be explained. For example, there is a first control valve 11 that is used for providing fluid under pressure to a bearing set consisting of hydrostatic bearing assemblies 12, 13, 14 and 15. There is a control valve 16 at the opposite side of the mass block 10 which is used for controlling a hydrostatic bearing set comprising hydrostatic bearing assemblies 17, 18, 19 and 20. There is a third external control valve 23 which is used for controlling a set of hydrostatic bearings comprising the bearing assemblies 24, 25, 26 and 27. As can be seen, the control valves 11, 16 and 23 are arranged in a tripod (three point) arrangement and the sets of bearings for each of the control valves include at least one bearing that is adjacent to the side controlled by another of the valves. This arrangement provides for nonredundant load sharing between the sets of bearings.

Now referring specifically to FIG. 2, a detailed showing of two of the bearing assemblies is provided in relation to their external control valve, and it is to be understood that each of the hydrostatic bearings is substantially identically constructed. The showing in FIG. 2 is somewhat schematic for simplicity, but each of the individual bearing assemblies, for example the assemblies 12 and 13 shown in FIG. 2, includes a cylinder member 30 which is suitably fastened to the bottom surface of the mass block 10, and which has interior piston chamber 31 mounting a piston member 32 that has a part spherical outer wall 33, and O-ring seal 34 which permits the piston to cock slightly with respect to the wall of the interior chamber 31 to compensate for irregularities in a supporting surface 36, which for example could be the floor on which the mass block is being supported.

The chambers 31 are connected to suitable conduits leading to a source of pressure, as shown a conduit 37, which is a common conduit connected to all of the interior chambers 31 of the respective bearing set. Suitable connections to the interior chambers are made to each of the chambers of the bearings in the particular set.

A passageway 38 is provided through each of the pistons 32 leading to the exterior surface of the cylinders, that is the surface 32A which faces the floor 36. The outer surface 32A is provided with an annular groove which mounts a sealing ring 40 and a back-up resilient O-ring 41 in the same groove to provide a sealed area on the surface indicated generally at 42 on the interior of the sealing rings.

The sealing ring arrangement is also explained in copending application Ser. No. 470,631, filed May 16, 1974. It can therefore be seen that any pressure in chamber 31 will also be present in the chamber 42 defined by the sealing ring 40, and this will provide a hydrostatic bearing surface between the surface 32A and the surface of the floor 36. The sealing ring 40 is a low friction material as tetrafloroethylene to insure that excessive friction is not present. The pressure inside the sealing ring will change when the pressure in the cylinders changes.

The control valve 11 is shown typically as including a housing 50, that is supported in a suitable manner on a bracket 51 supported with respect to the mass block 10. The valve has an interior spool 52 that is mounted in the housing 50 and has a spring 53 which is used for counteracting the weight of the spool and tends to hold the spool down. The lower end of the spool has a sliding foot 54 thereon that engages the surface 36. As shown, the valve is a three way valve having a pressure inlet port 55, a return port 56, and an outlet port 57. The pressure is from a separate constant pressure source that is provided from a suitable regulator. Also, the spool has a control land edge 52A which controls flow from the pressure port and a land edge 52B which controls flow to the return port.

The shoe 54 is adjusted to permit the desired height to be achieved by the mass block. The pressure in the cylinders is maintained so that the pistons are not bottomed in their cylinders. That is, the pistons are supported on fluid under pressure at all times during use. If the mass block settles so that the spool is moved upwardly relative to the housing 50, the flow from port 55, which is from a constant pressure source in the three way valve shown, will be provided to port 57, (edge 52A lifts up slightly from the position shown) and thus additional volume of oil will be provided to conduit 37 and subject the interior chambers 31 of the hydrostatic bearings in this set to additional pressure, tending to lift the mass block. The spool will remain in position with the shoe 54 on the surface 36 and the valve housing will thus be lifted along with the mass block until the edge 52A closes off the flow. The valve assemblies will modulate and reach an equilibrium where the mass block is supported at the desired height.

If the block moves and the shoe drops down because of an irregularity for example, the port 57 will be open to the return port 56 permitting some fluid to escape from the chambers 31 and letting the mass block lower.

When the hydrostatic bearings are arranged in sets as shown, they will all share the load so that if for example the end of the mass block supported by hydrostatic bearings 24, 25, 26 and 27 lowers, the bearing assemblies 15 and 20 tend to collapse causing back flow to the other bearings in the set and increasing the pressure to share the load.

As shown in FIG. 3 the valve 11 includes a dead band where pressure from the source is closed off by edge 52A and edge 52B is also keeping the return port closed. When the valve is in this position, cross flow is still permitted between the bearing in the set.

If a constant flow source is used for the fluid under pressure, a two way valve could be utilized. In such a case, with constant flow, the valve would include an external sensing foot as shown, and the amount of back pressure would relate to the opening of the valve in response to movement of the foot along a surface. The valve would close more as the mass block was lowered, just as it is illustrated in FIG. 3 in a three way valve.

The surface on which foot 54 moves does not necessarily need to sense the same surface as the surface on which the mass block is supported. The foot can be sensing position relative to a separate reference surface, if desired.

It should be understood that the arrangement of the piston and cylinder may be reversed from that shown. That is, the interior piston may be fixed to the object, while the outer cylinder may engage the floor surface. In such a case the hydrostatic film area would be enclosed by a ring carried on the bottom of the cylinder member.

What is claimed is:

1. A pressure balanced hydrostatic bearing for supporting an object having an object surface for movement in a direction generally parallel to a support surface including means forming a cylinder assembly positioned between said object and support surface, including a cylinder member and a piston member mounted in said cylinder member, means carried by one of said members defining a slidably sealed enclosed area on one of said surfaces to permit relative sliding movement between said one member and said one surface, means to supply fluid pressure to the interior of said cylinder member to act on said piston at a pressure sufficient to cause the object to be supported by fluid under pressure relative to the support surface, means defining a passageway from the interior of said cylinder member to the area enclosed by said sealing means to provide a fluid pressure support against the surface on which the area is defined, and means to sense deviations of said object from said support surface including a control valve means regulating the pressure to the interior of said cylinder member as a function of the distance between said object and said support surface.

2. The combination as specified in claim 1 wherein said control valve means includes a portion mounted to move with said object, and a second portion engaging said support surface and adjusting pressure to said cylinder member as a function of the relative spacing of the object and support surface.

3. The combination as specified in claim 1 wherein said object covers an area in a plane generally parallel to said support surface, and wherein there are a plurality of said pressure balanced bearings, each constructed substantially identically, and wherein said bearings are arranged in sets, each set comprising a plurality of bearings and at least one of the bearings of each set being positioned in a region of said object supported primarily by a different set of bearings.

4. The combination as specified in claim 1 wherein said control valve means controls flow to and from said cylinder member.

5. The combination as specified in claim 3 wherein there are a plurality of bearing sets, and each of said bearing sets is controlled by a separate control valve means.

6. The combination as specified in claim 5 wherein said control valve means are arranged in a generally tripod configuration with respect to said object to provide three spaced apart sensing positions for determining the position of said object relative to said support surface.

7. The combination as specified in claim 3 wherein the cylinders of each of the pressure balanced bearing in a bearing set are connected to a common conduit, whereby cross flow between said cylinders in each set is permitted, said control valve being connected to said conduit.

8. In a variable force fluid pressure actuated cylinder having a movable piston and operable to support objects with respect to a support surface, and which forms a pressure balanced hydrostatic bearing comprising means defining a sealed area for slidably supporting the object on a hydrostatic film, said sealed area being fluidly open to the interior of said cylinder to provide fluid under pressure in said sealed area which is a function of the pressure in said cylinder acting on the piston, the improvement comprising means to sense the spacing of said object and said support surface and adjust the pressure in said cylinder as a function of the distance said object is spaced from said support surface, said means to adjust being spaced from said cylinder.

9. The combination as specified in claim 8 wherein said means to sense and adjust comprises means to physically engage said support surface and control position of a control valve regulating flow to and from said cylinder as a function of the position of the object relative to said support surface.

10. The combination as specified in claim 8 wherein said means to sense and adjust includes a control valve assembly having two parts comprising a movable spool, and a housing, means to attach one of said parts in a fixed relationship to said object, and means attached to the other of said parts extending from the other of said parts into engagement with said support surface, whereby said second mentioned part senses deviation in spacing of the object from a desired position relative to said support surface as the object moves generally parallel to the support surface.

11. The combination as specified in claim 8 wherein said object extends over an area of said surface and moves in a plane generally parallel to said surface, a plurality of said cylinders being provided for supporting said object, said plurality of cylinders being arranged into a plurality of sets of cylinders, separate means to sense and adjust to separately control the pressure in the cylinders in each of said sets, said separate means to sense and adjust being spaced from the other separate means to sense and adjust.

12. The combination as specified in claim 11 including means to permit fluid flow between the cylinders in each of said sets without passing through the separate means to sense and adjust for the cylinders in that set.

13. The combination as specified in claim 11 wherein said sets are arranged so that each set primarily supports a portion of said object, and wherein there is one of the cylinders from each of said sets positioned on said object adjacent a portion supported primarily by another of said sets.

14. The combination as specified in claim 13 wherein said separate means to sense and adjust comprises individual valve means located exteriorly of said cylinder, and wherein said valve means are positioned to form a tripod configuration with respect to said object.

* * * * *